US009428087B2

(12) United States Patent
Adachi et al.

(10) Patent No.: US 9,428,087 B2
(45) Date of Patent: Aug. 30, 2016

(54) VEHICLE SEAT (75) Inventors: Takamasa Adachi, Tochigi (JP); Satoshi Fujita, Tochigi (JP); Kenichi Niitsuma, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 107 days.

(21) Appl. No.: 13/995,757

(22) PCT Filed: Dec. 22, 2011

(86) PCT No.: PCT/JP2011/079915
§ 371 (c)(1),
(2), (4) Date: Jun. 19, 2013

(87) PCT Pub. No.: WO2012/086804
PCT Pub. Date: Jun. 28, 2012

(65) Prior Publication Data
US 2013/0264849 A1 Oct. 10, 2013

(30) Foreign Application Priority Data

| Dec. 24, 2010 | (JP) | ................................. 2010-287921 |
| Dec. 24, 2010 | (JP) | ................................. 2010-287923 |
| Dec. 24, 2010 | (JP) | ................................. 2010-287925 |
| Dec. 24, 2010 | (JP) | ................................. 2010-287927 |

(51) Int. Cl.
*B60N 2/42* (2006.01)
*B60N 2/427* (2006.01)
(Continued)

(52) U.S. Cl.
CPC ......... *B60N 2/4228* (2013.01); *B60N 2/42709* (2013.01); *B60N 2/42745* (2013.01); *B60N 2/64* (2013.01); *B60N 2/68* (2013.01)

(58) Field of Classification Search
None
See application file for complete search history.

(56) References Cited

U.S. PATENT DOCUMENTS

| 5,447,360 A | * | 9/1995 | Hewko et al. ........... 297/452.18 |
| 6,217,062 B1 | * | 4/2001 | Breyvogel ............... B60N 2/68 |
| | | | 280/728.2 |

(Continued)

FOREIGN PATENT DOCUMENTS

| JP | 60-88841 | 6/1985 |
| JP | 61-17348 | 1/1986 |

(Continued)

OTHER PUBLICATIONS

Supplementary Search Report issued in counterpart European Patent Application No. 11850003.2 (May 4, 2015).

(Continued)

*Primary Examiner* — David E Allred
(74) *Attorney, Agent, or Firm* — Hamre, Schumann, Mueller & Larson, P.C.

(57) ABSTRACT

A vehicle seat comprises a seat bottom frame 2 as a frame of a seat bottom allowing an occupant to sit thereon, and a seat back frame 1 supported by the seat bottom frame 2. The seat back frame 1 includes right and left side frames SF laterally spaced apart from each other, and a lower connecting member 30 disposed and extending between lower portions of the right and left side frames SF and configured to connect the right and left side frames SF, and the lower connecting member 30 includes a rear wall portion connected to and supported by the side frames SF, and a front wall portion 31 disposed frontward of the rear wall portion and extending downward from an upper end of the rear wall portion, and a front surface 31A of the front wall portion 31 has an upper portion and a lower portion which is located frontward of the upper portion.

13 Claims, 10 Drawing Sheets

(51) Int. Cl.
*B60N 2/64* (2006.01)
*B60N 2/68* (2006.01)

(56) References Cited

U.S. PATENT DOCUMENTS

| | | | |
|---|---|---|---|
| 6,921,132 B2* | 7/2005 | Fujita et al. | 297/216.13 |
| 7,066,552 B2 | 6/2006 | Yoshida | |
| 8,708,409 B2* | 4/2014 | Nitsuma | 297/216.14 |
| 8,727,438 B2 | 5/2014 | Nitsuma | |
| 8,814,269 B2* | 8/2014 | Suzuki et al. | 297/284.4 |
| 2002/0030392 A1* | 3/2002 | Kitagawa | 297/216.13 |
| 2004/0195873 A1* | 10/2004 | Saberan et al. | 297/216.13 |
| 2004/0227389 A1 | 11/2004 | Yoshida | |
| 2004/0232743 A1 | 11/2004 | Fujita et al. | |
| 2005/0093352 A1* | 5/2005 | Yasuda | B60N 2/222 297/284.1 |
| 2005/0264053 A1* | 12/2005 | Saberan et al. | 297/216.13 |
| 2006/0006709 A1* | 1/2006 | Uno et al. | 297/216.12 |
| 2010/0181812 A1* | 7/2010 | Nitsuma | 297/216.13 |
| 2010/0187876 A1* | 7/2010 | Nitsuma | 297/216.13 |
| 2011/0193379 A1* | 8/2011 | Nitsuma | 297/216.14 |
| 2011/0204604 A1* | 8/2011 | Hoshi | B60N 2/4235 280/730.2 |
| 2011/0204693 A1 | 8/2011 | Nitsuma | |
| 2011/0272978 A1 | 11/2011 | Nitsuma | |
| 2011/0278886 A1 | 11/2011 | Nitsuma | |
| 2011/0298267 A1* | 12/2011 | Yamaki | B60N 2/4228 297/391 |
| 2012/0292961 A1* | 11/2012 | Nitsuma et al. | 297/216.14 |
| 2013/0119723 A1* | 5/2013 | Nitsuma | 297/216.13 |
| 2013/0257117 A1* | 10/2013 | Seki | B60N 2/4228 297/216.1 |
| 2013/0270878 A1* | 10/2013 | Adachi | B60N 2/4228 297/216.14 |
| 2014/0103626 A1* | 4/2014 | Seki | B60N 2/4228 280/730.2 |
| 2015/0203013 A1* | 7/2015 | Akutsu | B60N 2/5825 297/452.18 |
| 2015/0246627 A1* | 9/2015 | Shimizu | B60N 2/66 297/216.14 |

FOREIGN PATENT DOCUMENTS

| | | | |
|---|---|---|---|
| JP | 2001-95647 | 4/2001 | |
| JP | 2008-67723 | 3/2008 | |
| JP | 2008-67724 | 3/2008 | |
| JP | WO 2010024395 A1 * | 3/2010 | B60N 2/4228 |
| JP | 2010-83269 | 4/2010 | |
| JP | 2010-179754 | 8/2010 | |
| WO | 2010/024395 A1 | 3/2010 | |
| WO | WO 2010/024395 | 3/2010 | |
| WO | WO 2010/084911 | 7/2010 | |
| WO | WO 2010109845 A1 * | 9/2010 | B60N 2/42 |

OTHER PUBLICATIONS

Office Action issued in counterpart Japanese Patent Application No. 2014-226288 on Aug. 25, 2015, and corresponding English translation.

* cited by examiner

VEHICLE SEAT

TECHNICAL FIELD

The present invention relates to a vehicle seat such as a car seat, and particularly to a vehicle seat which improves an occupant's seating feeling in a rear-end collision.

BACKGROUND ART

If a vehicle is rear-ended or the vehicle collides at the rear end while reversing (i.e., what is called a rear-end collision), the head of an occupant seated on a vehicle seat tilts backward due to inertia, with the result that the neck of the occupant may receive an impact.

In order to protect the head and the neck of the occupant from an impact caused by a rear-end collision and thus reduce the impact on the neck, the vehicle seat has a headrest which is provided at an upper portion of the seat back and designed to receive the head of the occupant at the rear side. To efficiently reduce the impact in the rear-end collision, it is desirable to quickly reduce a gap between the head of the occupant and the headrest in the rear-end collision.

For this purpose, there has been suggested a seat back configured to allow the upper body of the occupant to be moved backward in a rear-end collision, to receive the load generated by this movement by a pressure-receiving member and to cause the headrest to move frontward, and to support the head of the occupant to thereby reduce the impact on the neck of the occupant (see Patent Literature 1).

The seat back frame of the vehicle seat disclosed in Patent Literature 1 has right and left side frames which are connected with each other at their lower portions by a plate-like lower frame (lower connecting member) and a rotary supporting shaft for seat reclining which is disposed frontward of the lower frame. The lower frame is not limited to one having a plate-like shape; as disclosed in Patent Literature 2, the lower frame may have frontwardly extending flanges at upper and lower ends thereof. These lower frames are oriented to a substantially vertical attitude when the occupant sits in a normal seating posture, such that it is slightly faced down with respect to the upper portion of the seat back (where an upper region of the back of the occupant contacts).

CITATION LIST

Patent Literature

Patent Literature 1: Japanese Laid-open Patent Application, Publication No. 2010-083269
Patent Literature 2: Japanese Laid-open Patent Application, Publication No. 2008-067723

SUMMARY OF THE INVENTION

Technical Problem

When a rear-end collision occurs, the occupant is pressed against the seat back. In particular, in the case where the seat back has a movable pressure-receiving member as disclosed in Patent Literature 1, the occupant is deeply sunk into the seat back. In this instance, the load from the occupant causes the seat back cushion to be sunk down so that a region from waist to buttocks of the occupant approaches the upper end of the lower frame and the occupant may feel a tactile sensation because of the presence of the lower frame. The upper edge or the upper flange of the lower frame may damage the seat back cushion. Further, if the shaft for seat reclining is provided in the vehicle seat, the region from waist to buttocks of the occupant approaches the shaft and the occupant may also feel a tactile sensation because of the presence of the shaft.

In recent years, in consideration of a side collision of a car and the like, there has been a demand for a vehicle seat having a structure with sufficient rigidity such that the seat is less likely to collapse even when a load is applied from a side of the vehicle and the load from the side is transmitted to a center of the vehicle.

The present invention has been made in view of the above background, and it is an object of the present invention to alleviate a tactile sensation of the occupant caused by the lower connecting member in a rear-end collision.

Solution to Problem

A vehicle seat according to the present invention which solves the above problem comprises a seat bottom frame as a frame of a seat bottom allowing an occupant to sit thereon, and a seat back frame supported by the seat bottom frame, wherein the seat back frame includes right and left side frames laterally spaced apart from each other, and a lower connecting member disposed and extending between lower portions of the right and left side frames and configured to connect the right and left side frames, and wherein the lower connecting member includes a rear wall portion connected to and supported by the side frames, and a front wall portion disposed frontward of the rear wall portion and extending downward from an upper end of the rear wall portion, and a front surface of the front wall portion has an upper portion and a lower portion which is located frontward of the upper portion.

With this configuration, since the front surface of the lower connecting member has the upper portion and the lower portion which is located frontward of the upper portion, when a rear-end collision occurs, the upper end of the lower connecting member does not strongly contact the region from the waist to buttocks of an occupant (hereinafter referred to as a buttocks region). Herein, the front/rear (frontward/rearward) is designated as from the view point of an occupant seated on the vehicle seat that is in the normal position where the vehicle seat is not being reclined.

If a large load is imposed from the occupant, the lower connecting member can deform at a portion connecting the rear wall portion and the front wall portion, and so the impact in a collision can be absorbed.

Further, since the lower connecting member is disposed and extends between lower portions of the right and left side frames, and the lower connecting member includes the front wall portion and the rear wall portion, the lower connecting member has enhanced rigidity resisting the crush in the right-left direction as compared to the conventional lower connecting member (lower frame) having a simple plate-like shape, and can transmit a load from a side to a center (of the car and the like).

In the above vehicle seat, the seat back frame may have a pipe extending in the upper-lower direction, and the front surface of the front wall portion may be parallel to the direction along which the pipe extends or slanted to face obliquely upward with respect to this pipe-extending direction. In the case where the pipe extending in the upper-lower direction curves frontward or rearward, the orientation of the front surface is determined based on the portion of the pipe which is closest the vertical.

In the above vehicle seat, it is preferable that the front wall portion extends downward beyond the rear wall portion. With this configuration, the size of the front wall portion can be enlarged to alleviate the tactile sensation of the occupant, and since the length of the front wall portion from the upper end to the lower end thereof is long, the front wall portion is easily deformable in the rear direction during a rear-end collision.

In the above vehicle seat, the front wall portion may be tilted such that the front surface thereof faces obliquely upward with respect to the rear wall portion. With this configuration of the front wall portion being tilted to face obliquely upward with respect to the rear wall portion, the front wall portion and the rear wall portion are connected at their upper ends and open wide downward, so as to ensure a stroke for deformation by causing the front wall portion to deform rearward during a rear-end collision.

In the above vehicle seat, it is preferable that an upper wall portion connecting the rear wall portion and the front wall portion is shaped like a flat plate extending substantially in the front-rear direction. In this configuration, since the upper wall portion has a flat plate-shaped portion extending in the front-rear direction, a sufficient front-rear distance at the upper end portion between the front wall portion and the rear wall portion can be ensured, so as to ensure a longer stroke for deformation by causing the front wall portion to deform rearward during a rear-end collision.

In the above vehicle seat, the seat back frame may be rotatably supported by the seat bottom frame through a reclining mechanism, the reclining mechanism may include a shaft configured to connect the right and left side frames and disposed at a position on a rotation axis between the seat bottom frame and the seat back frame, and the front wall portion may be disposed in front of the shaft.

In the case where the vehicle seat has a shaft for seat reclining, since the front wall portion of the lower connecting member is disposed in front of the shaft, a load applied to the buttocks region of the occupant through the seat back cushion does not directly act on the shaft but acts on the front wall portion instead, so that the tactile sensation that the occupant feels from the shaft at his/her buttocks region can be alleviated.

It is preferable that each of the lower portions of the right and left side frames has a side wall portion and a plate-like inner extension configured to extend inward from a rear end of the side wall portion, and that an inner end of the inner extension has a slanted edge portion which is slanted with respect to a vertical direction, and the rear wall portion is welded to the inner extension along the slanted edge portion.

With this configuration, since the rear wall portion of the lower connecting member is welded along the slanted edge portion of the inner extension which is slanted with respect to the vertical direction, the weld length longer than the width of the rear wall portion in the vertical direction can be ensured, so that the lower connecting member can be firmly fixed to the right and left side frames. This can enhance the rigidity of the seat back frames and enables efficient transmission of a load from a side to a center (of the car and the like). In other words, increase in the weld length at positions between the lower connecting member and the inner extensions can enhance the rigidity in the right-left direction without the need for enlarging the vertical size of the lower connecting member.

It is preferable that the slanted edge portion is slanted with respect to the vertical direction at an angle equal to or greater than 20 degrees. If the slanted edge portion is slanted with respect to the vertical direction at an angle of 20 degrees or greater, the advantage of increasing the weld length can be improved. Preferably, if the slanted edge portion is slanted with respect to the vertical direction at an angle of 70 degrees or smaller, it is possible to prevent the slanted edge portion from being extremely sharp-angled.

It is preferable that each of the lower portions of the right and left side frames has a side wall portion and a plate-like inner extension configured to extend inward from a rear end of the side wall portion, that the rear wall portion of the lower connecting member is fixed to each of the inner extensions, and each inner extension has an attachment hole through which a fixing member for fixing a fixed part is inserted, and that the rear wall portion has relieves each provided at a position corresponding to the attachment hole to avoid interference with the fixing member.

With this configuration, since the rear wall portion of the lower connecting member has relieves, when the fixed part such as a back-side cover for the seat back or a harness is fixed, interference between the fixing member and the rear wall portion can be avoided and the assembly operation is easily performed. In other words, the interference between the fixing member and the rear wall portion can be avoided even if the rear wall portion has some error in the size or the shape thereof, with the result that the assembly of the lower connecting member and the side frames, and the attachment of the fixing member can be carried out easily without the need for paying particular attention to these operations.

For example, the relieves may be recess portions. Providing the recess portions as the relieves makes it possible to ease the assembly, while avoiding interference with the fixing member without diminishing the strength of the rear wall portion.

Alternatively, for example, the relieves may be through-openings. Providing the through-openings as the relieves makes it possible to easily manufacture the lower connecting member by press working sheet metal because the relieves can be easily formed by blanking.

A vehicle seat according to the present invention which solves the above problem comprises a seat bottom frame as a frame of a seat bottom allowing an occupant to sit thereon, and a seat back frame rotatably supported by the seat bottom frame through a reclining mechanism, wherein the seat back frame includes right and left side frames laterally spaced apart from each other, and a lower connecting member disposed and extending between lower portions of the right and left side frames and configured to connect the right and left side frames, wherein the reclining mechanism includes a shaft configured to connect the right and left side frames and disposed at a position on a rotation axis between the seat bottom frame and the seat back frame, and wherein the lower connecting member has a front wall portion disposed in front of the shaft, and a front surface of the front wall portion has an upper portion and a lower portion which is located frontward of the upper portion.

With this configuration, since the lower connecting member has the front wall portion, and the front surface of the front wall portion has an upper portion and a lower portion which is located frontward of the upper portion, when a rear-end collision occurs, the upper end of the lower connecting member does not strongly contact the region from the waist to buttocks of an occupant (hereinafter referred to as a buttocks region).

Further, since the front wall portion of the lower connecting member is disposed in front of the shaft, a load applied to the buttocks region of the occupant through the seat back cushion does not directly act on the shaft but acts on the front wall portion instead, so that the tactile sensation that the occupant feels from the shaft at his/her buttocks region can be alleviated.

The above vehicle seat preferably comprises a lower flange provided by folding the front wall portion rearward at its lower end, and a folded-back flange disposed below the lower flange and provided by folding the lower flange forward at its rear end, and a front end of the folded-back flange is located rearward of the lower end of the front wall portion.

In this configuration, since the lower connecting member has the lower flange and the folded-back flange, the sectional area of the lower connecting member increases to thereby enhance the rigidity in the right-left direction, and the load can be successfully transmitted in the transverse direction. Further, since the front end of the folded-back flange is located rearward of the lower end of the front wall portion (i.e., portion connecting the front wall portion and the lower flange), when a rear-end collision occurs, the front end of the folded-back flange does not strongly contact the seat back cushion. This can alleviate the tactile sensation of the occupant as well as prevent damage of the seat back cushion.

The above vehicle seat preferably comprises an upper wall portion provided by folding the front wall portion at its upper end and configured to extend rearward.

Since the upper wall portion folded at the upper end of the front wall portion and extending rearward is provided, the rigidity of the lower connecting member is enhanced and a load can be efficiently transmitted from a side to a center (of the car and the like).

The above vehicle seat may further comprise a rear wall portion disposed rearward of the front wall portion and extending downward from the front wall portion, and the rear wall portion may be connected to the side frames.

With this configuration, when a rear-end collision occurs, movement of the rear wall portion is restricted so that a deformation is likely to occur at the connecting portion between the front wall portion and the rear wall portion, with the result that the rearward movement of the front wall portion is readily controllable.

The above vehicle seat may preferably comprise a pressure-receiving member disposed between the right and left side frames and movable in a rearward direction, a connecting wire configured to connect the pressure-receiving member to the side frames, and rotatable members which are rotatably supported by the right and left side frames and to which the connecting wire is connected, and a rotation axis of each rotatable member may be located rearward of the lower connecting member.

With this configuration, when a rear-end collision occurs, the lower connecting member first receives the occupant, and then efficiently causes the upper body of the occupant to move rearward.

DESCRIPTION OF EMBODIMENTS

With reference to the drawings, one embodiment of the present invention will be described below.

Figure 1:
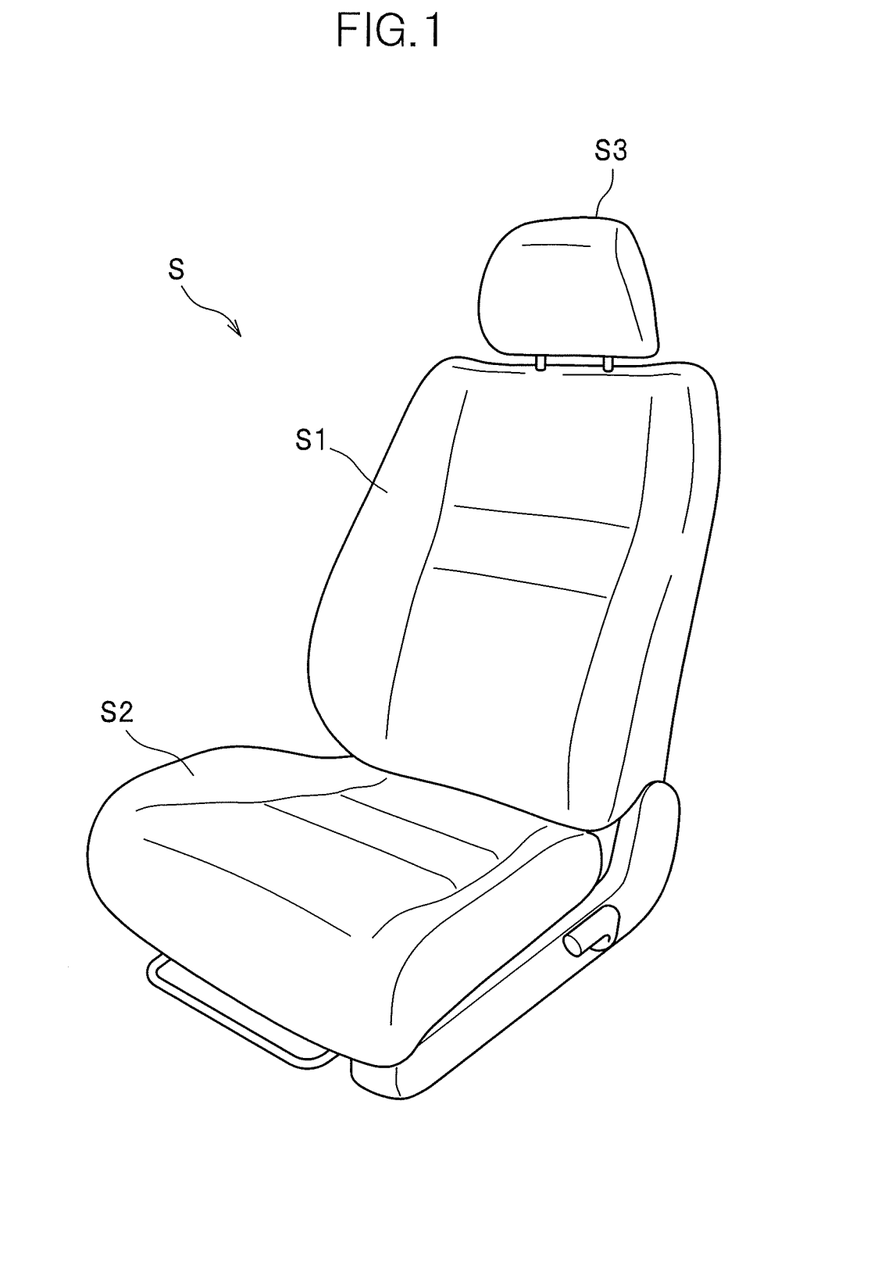
FIG. 1 is a perspective view of a car seat.

As seen in FIG. 1, a car seat S as an example of a vehicle seat of the present invention includes a seat back S1, a seat bottom S2, and a headrest S3. In this specification, the front/rear (frontward/rearward), right/left (lateral) directions are designated as from the view point of an occupant seated on the car seat S that is in the normal position where the seat back S1 is raised (i.e., not in the position where the occupant lies on his/her back by reclining the seat).

Figure 2:
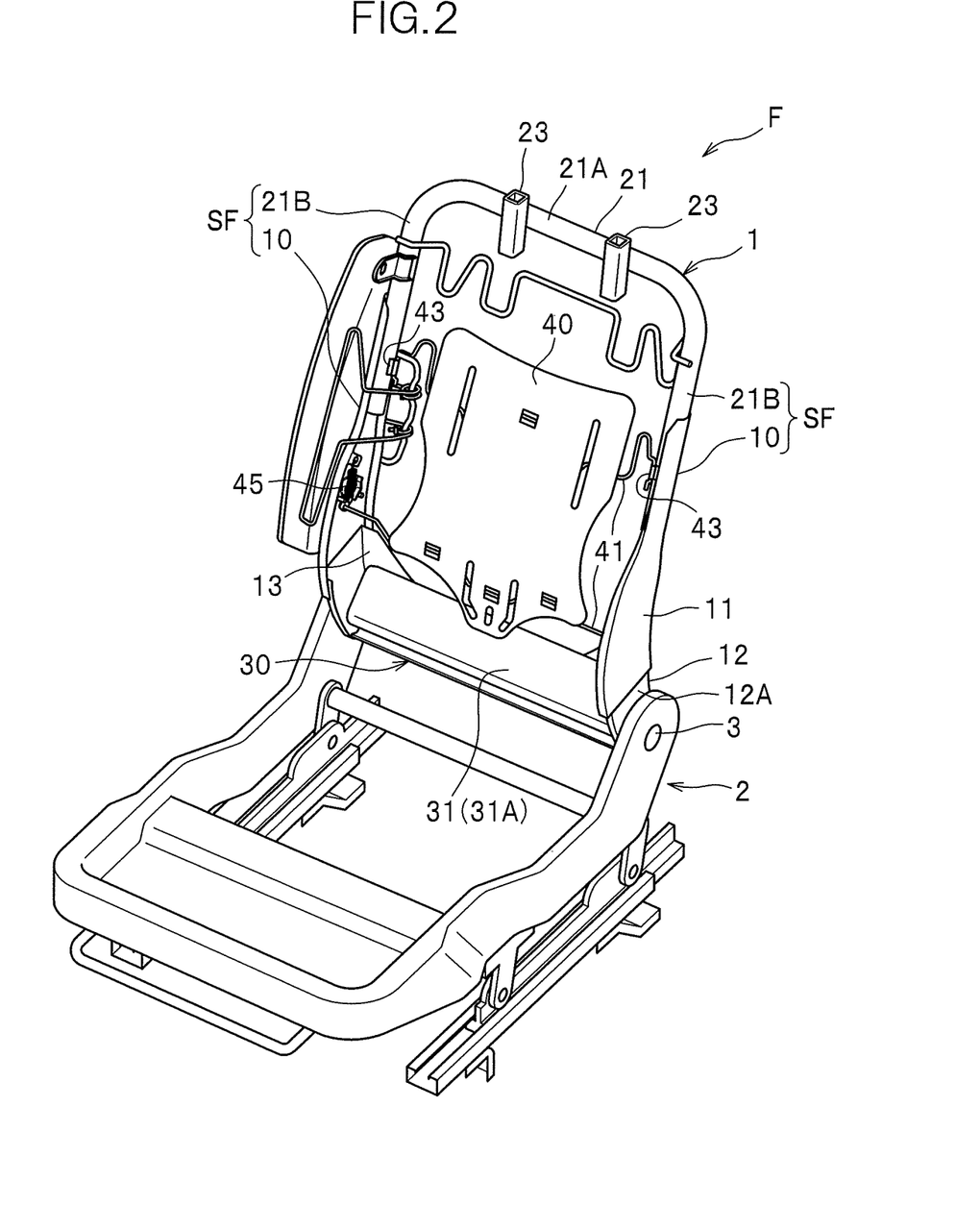
FIG. 2 is a perspective view of a seat frame.

A seat frame F as shown in FIG. 2 is provided inside the car seat S. The seat frame F includes a seat back frame 1 which is a frame of the seat back S1, and a seat bottom frame 2 which is a frame of the seat bottom S2. The seat bottom frame 2 and the seat back frame 1 are connected through a reclining mechanism 3 (detailed structure thereof is not shown in the drawings). The seat back S1 and the seat bottom S2 are configured such that the seat back frame 1 and the seat bottom frame 2 are covered with cushion and a skin, and that a cover 5 (see FIG. 6) as an example of a fixed part is attached to the rear surface of the seat back frame 1 using a clip 51 as an example of a fixing member.

The seat back frame 1 includes right and left side plates 10 laterally spaced apart and extending in an upper-lower direction, an upper frame 21 connecting upper end portions of the side plates 10, and a lower connecting member 30 connecting lower end portions of the right and left side plates 10, to thereby form a frame-like configuration. The upper frame 21 is formed by bending a metal pipe into a U-shape and includes an upper connecting portion 21A extending in the right-left direction, and connecting portions 21B extending downward from right and left ends of the upper connecting portion 21A. The connecting portions 21B are connected to upper ends of the side plates 10 by welding.

Each side plate 10 includes a lower member 12 provided at the lower end portion of the side plate 10 and made by press working sheet metal, and an upper member 11 integral with the upper part of the lower member 12 by welding. The lower member 12 includes a side wall portion 12A, and an inner extension 13 extending inward from the rear end of the side wall portion 12A.

Figure 5:
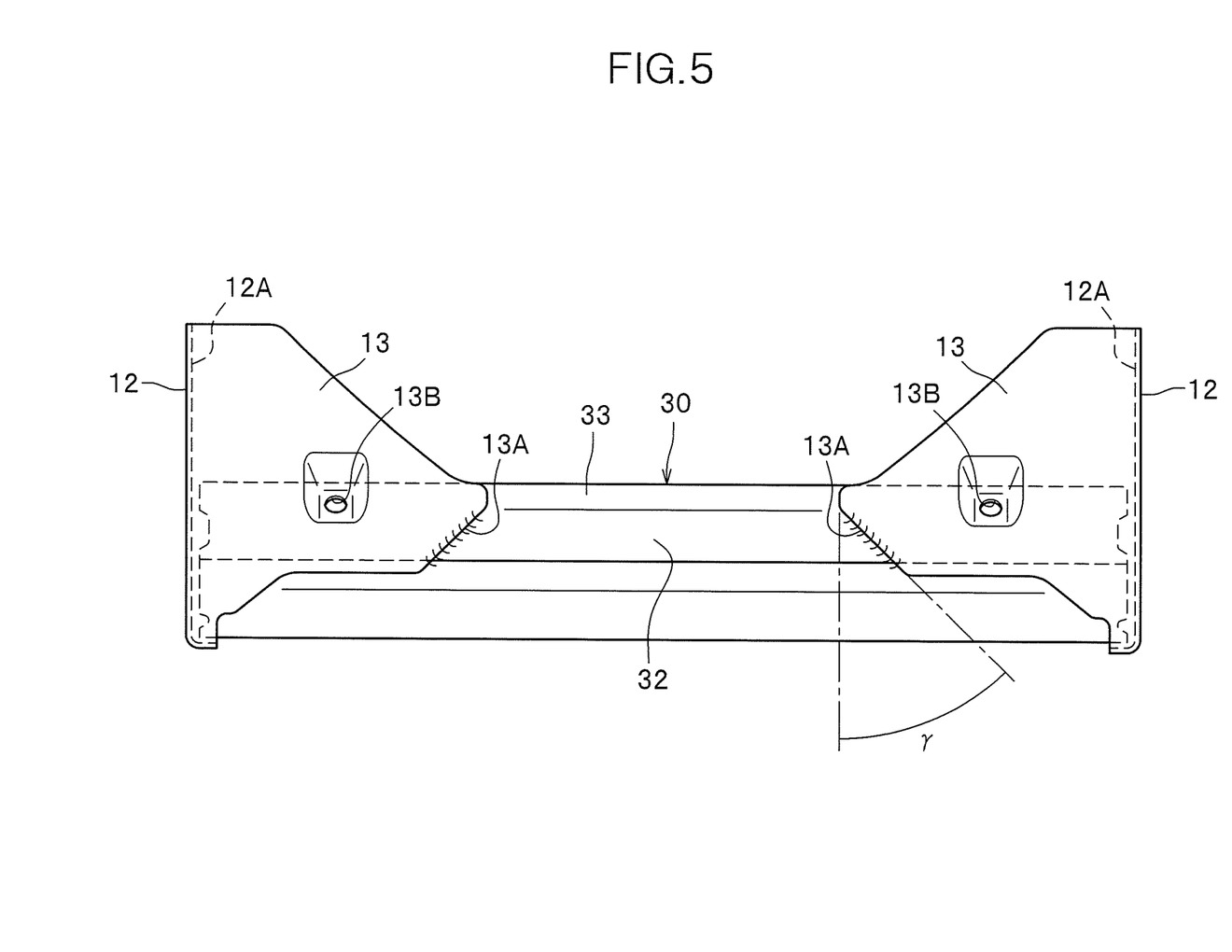
FIG. 5 is a view showing welds between a rear wall portion and inner extensions, when viewing a seat back frame from rear.

As seen in FIG. 5, the inner extension 13 has a slanted edge portion 13A which is slanted at an angle γ with respect to the vertical direction such that an inner end portion thereof extends from inward to outward as it goes from upward to downward. As will be described later, the slanted edge portion 13A is a portion for connecting the lower connecting member 30 and the inner extension 13 by welding. Further, the inner extension 13 has a clip hole 13B as an example of an attachment hole, through which a clip 51 for attachment of a back-side cover 5 for the seat back S1 is inserted.

Returning to FIG. 2, the seat back frame 1 has side frames SF, each including the side plate 10 and the connecting portion 21B of the upper frame 21. A plate-like pressure receiving member 40 made of a resin material is disposed between the right and left side frames SF, and the pressure receiving member 40 is connected to the right and left side frames SF at two parts, namely at upper and lower parts thereof, through connecting wires (connecting members) 41 made of bent wires having spring characteristics. To be more specific, the upper connecting wire 41 has end portions which are engaged with brackets 43 welded to the connecting portions 21B, and the lower connecting wire 41 has lower ends which are connected to rotatable members 45 swingable in the front-rear direction. Each rotatable member 45 is fixed to the side plate 10 (upper member 11) and configured, for example, as disclosed in Japanese Laid-open Application Publication No. 2010-179748, such that the lower end of an arm is normally positioned frontward, but if a large force directing rearward is applied from the connecting wire 41, the lower end of the rotatable member 45 swings backward to allow the pressure receiving member 40 to move backward to a large extent.

It is noted that since the rotation axis of the rotatable member 45 is located rearward of the lower connecting member, when a rear-end collision occurs, the lower connecting member 30 first receives the occupant, and then efficiently causes the upper body of the occupant to move rearward.

Pillar support portions 23 are provided on the upper frame 21, and a headrest frame (not shown) is attached to the pillar support portions 23. The headrest frame is covered with a cushion member to provide the headrest S3 as described above.

Next, the lower connecting member 30 will be described. The lower connecting member 30 is disposed and extending between lower portions of the right and left side frames SF. Accordingly, the seat frame F is less likely to be crushed in the lateral direction even if a load is applied from side, so that the load from side can be transmitted to a center of the car. Further, the lower connecting member 30 supports the buttocks region of the occupant during a rear-end collision and prevents the buttocks region from moving rearward; therefore, the lower connecting member 30 causes the upper body of the occupant to rotate rearward with the buttocks region acting as a fulcrum.

Figure 3:
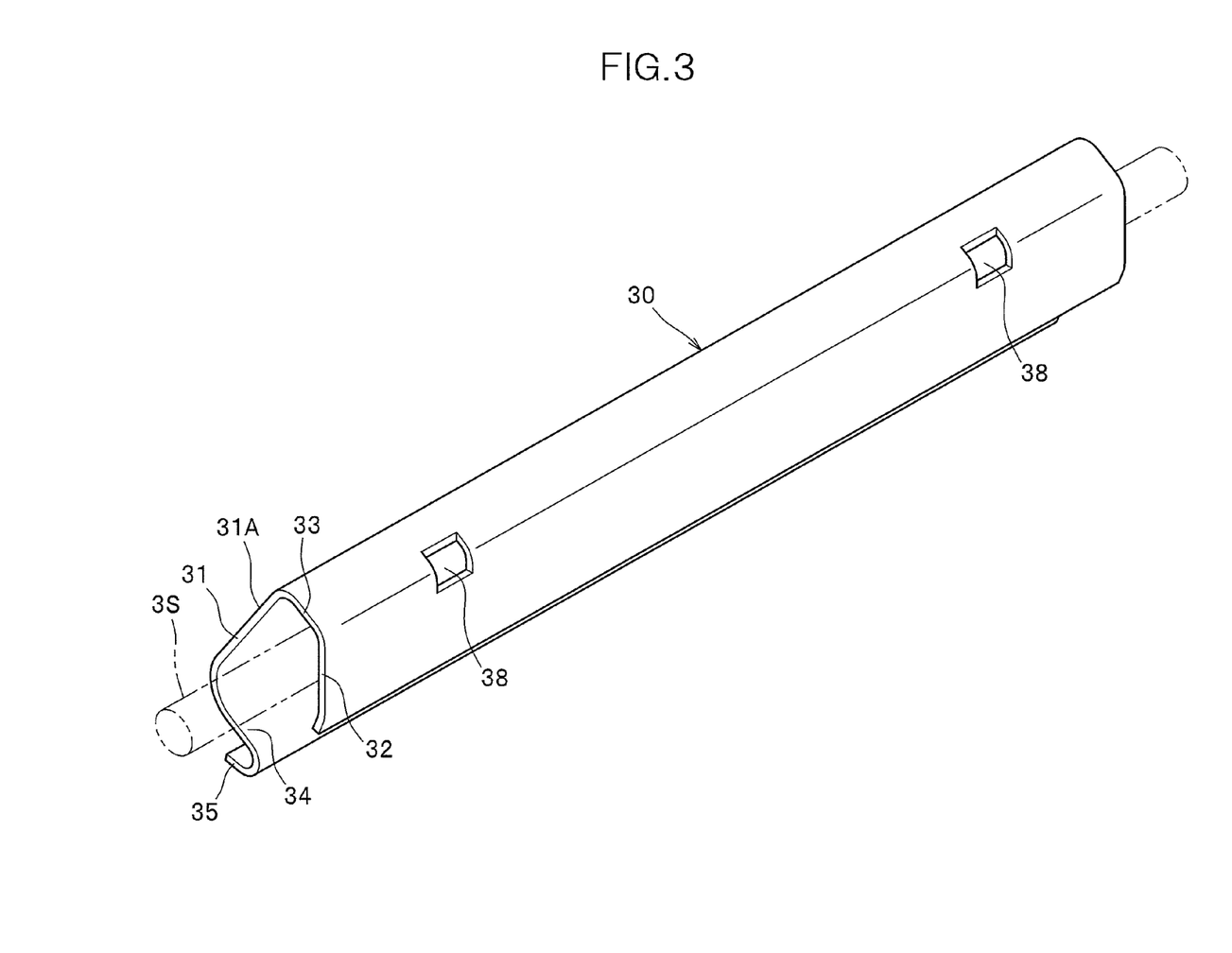
FIG. 3 is an enlarged perspective view of a lower connecting member.

The lower connecting member 30 is formed of sheet metal, and as seen in FIG. 3, the lower connecting member 30 includes a front wall portion 31, a rear wall portion 32, an upper wall portion 33 extending rearward from the upper end of the front wall portion 31 and connecting the front wall portion 31 and the rear wall portion 32, a lower flange 34, and a folded-back flange 35.

The front wall portion 31 is disposed in front of a shaft 3S of the reclining mechanism 3. The shaft 3S is disposed at a position on the rotational axis between the seat bottom frame 2 and the seat back frame 1, and in order to support the rotation by the reclining mechanism 3, the shaft 3S is configured to connect the right and left side frames SF. Since the front wall portion 31 of the lower connecting member 30 is disposed in front of the shaft 3S, a load applied from the buttocks region of the occupant through the seat back cushion does not directly act on the shaft 3S but acts on the front wall portion instead, so that the tactile sensation that the occupant feels from the shaft 3S at his/her buttocks region can be alleviated.

Figure 4:
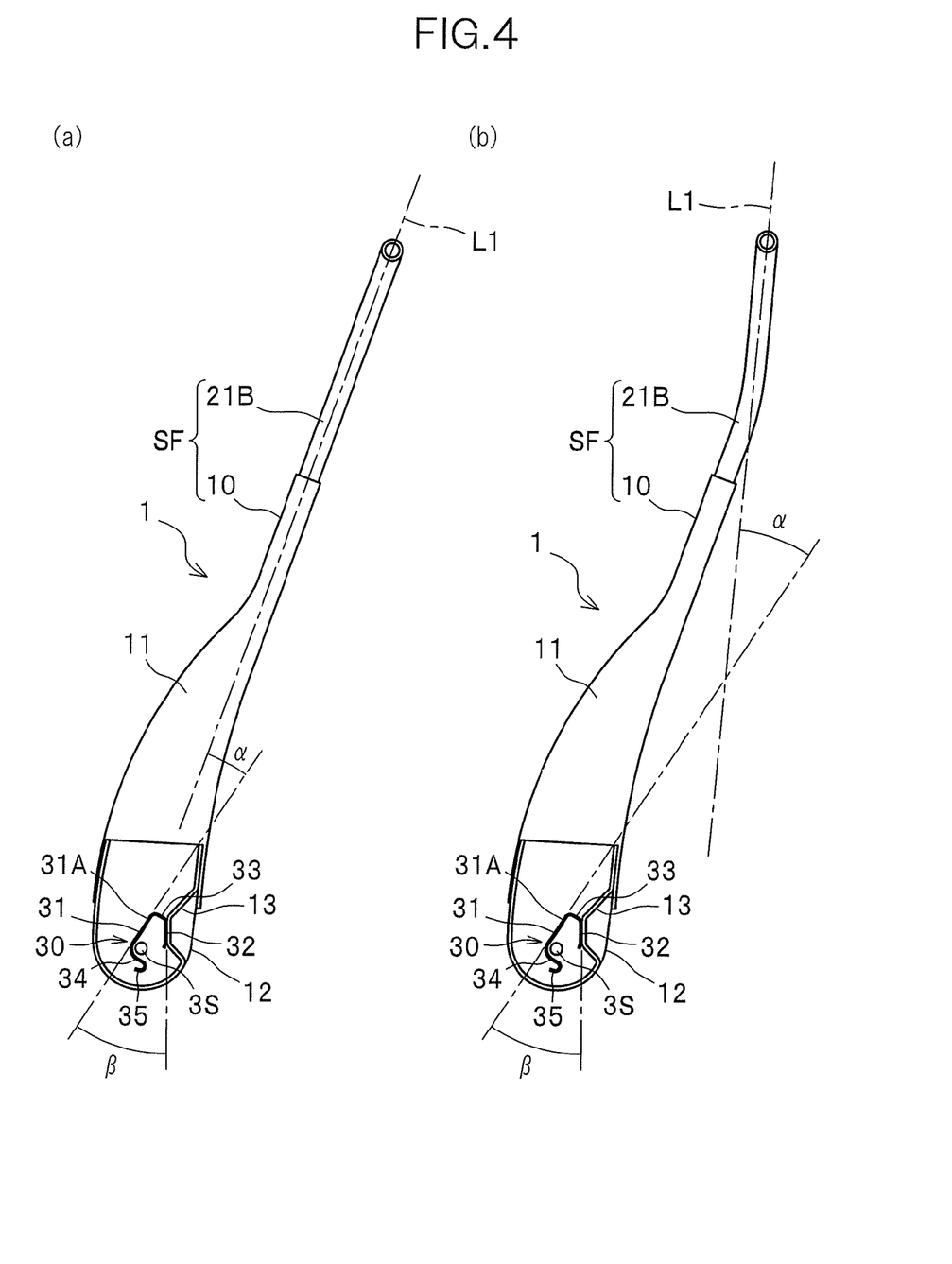
FIG. 4 includes explanatory views (a) and (b) each explaining the angle of a front surface of a front wall portion.

As seen in FIG. 4(a), the front wall portion 31 has a front surface 31A, and the front surface 31A has an upper portion and a lower portion which is located frontward of the upper portion. To be more specific, as viewed from side, the front surface 31A is parallel to the direction along which the connecting portions 21B extend (i.e., line L1) or slanted to face obliquely upward with respect to this extending direction. According to the example shown in FIG. 4(a), the front surface 31A faces obliquely upward and is slanted at an angle α with respect to the line L1. Further, the front wall portion 31 faces obliquely upward and is slanted at an angle β with respect to the rear wall portion 32. Accordingly, the front wall portion 31 and the rear wall portion 32 are connected at their upper ends and shaped to open wide downward, so as to ensure a stroke for deformation by causing the front wall portion 31 to deform rearward in a rear-end collision. The connecting portions 21B which are made of a pipe for constituting the side frames SF are not necessary to be straight as viewed from side, and as seen in FIG. 4(b), the upper portions thereof may curve frontward to rise upward or alternatively curve rearward to lie down. In these cases, the angle of the front surface 31A with respect to the pipe (the connecting portions 21B) are determined based on the orientation of the pipe at its position closest to the vertical.

The lower end of the front wall portion 31 extends downward beyond the lower end of the rear wall portion 32. Accordingly, the size of the front wall portion 31 can be enlarged to alleviate the tactile sensation that the occupant feels from the lower connecting member 30, and since the length of the front wall portion 31 from the upper end to the lower end thereof is long, the front wall portion 31 is rendered easily deformable in the rear direction during a rear-end collision.

The rear wall portion 32 is a wall connected to the side frames SF (the inner extensions 13); in other words, the rear wall portion 32 is a member configured to connect and support the lower connecting member 30 to the side frames SF. To be more specific, as seen in FIG. 4(a), the rear surface of the rear wall portion 32 is brought into contact with the front surfaces of the inner extensions 13, and thereafter, as seen in FIG. 5, the inner extensions 13 and the rear wall portion 32 are welded together along the slanted edge portions 13A of the inner extensions 13. Since the slanted edge portion 13A is slanted with respect to the vertical direction, even in the case where the dimension of overlapping regions of the slanted edge portion 13A and the rear wall portion 32 is small in the height direction, the weld length can be made long enough to maintain the required weld strength. The angle γ of the slanted edge portion 13A is preferably 20 degrees or greater. If the angle γ is 20 degrees or greater, the advantage of increasing the weld length can be improved. More preferably, the angle γ is 30 degrees or greater, and further more preferably, angle γ is 40 degrees or greater. In the meantime, if the angle γ is 70 degrees or smaller, it is possible to prevent the inner extension 13 from being extremely sharp-angled.

Further, since the rear wall portion 32 is fixed to the side frames SF, when a rear-end collision occurs, movement of the rear wall portion 32 in the rear direction is restricted so that a deformation is likely to occur at the connecting portion between the front wall portion 31 and the rear wall portion 32, with the result that the rearward movement of the front wall portion 31 is readily controllable.

As described above, since the lower connecting member 30 in this embodiment has the front wall portion 31 and the rear wall portion 32 connected to the front wall portion 31, the lower connecting member 30 has enhanced rigidity resisting the crush in the right-left direction as compared to the lower connecting member having a simple plate-like shape, and can efficiently transmit a load from a side to a center of the car.

As seen in FIG. 3, the upper wall member 33 is shaped like a flat plate extending substantially in the front-rear direction. This makes it possible to adequately keep the front-rear distance between the upper end of the front wall portion 31 and the upper end of the rear wall portion 32 and hence to keep a long deformation stroke achieved when deformation causing the front wall portion 31 to move rearward occurs. Further, the connecting portion between the front wall portion 31 and the upper wall portion 33 has an edgeless gently curved shape formed by bending the sheet metal between the upper wall portion 33 and the front wall portion 31 into a naturally curved shape.

The lower flange 34 is provided by folding the front wall portion 31 rearward at its lower end at a position below the shaft 3S. The connecting portion between the front wall portion 31 and the lower flange 34 has an edgeless gently curved shape formed by bending the sheet metal between the lower flange 34 and the front wall portion 31 into a naturally curved shape. The lower flange 34 is not connected to the rear wall portion 32, and so the lower connecting member 30 is not configured to provide a closed section. In this configuration, since the lower flange 34 and the rear wall portion 32 are not connected and a gap is formed therebetween, deformation as to cause the front wall portion 31 to move rearward is made easier.

The folded-back flange 35 is provided by folding the lower flange 34 forward at its rearward end at a position below the lower flange, and the front end of the folded-back flange 35 is located rearward of the lower end of the front wall portion 31. In this configuration, since the lower connecting member 30 has the lower flange 34 and the folded-back flange 35, the sectional area of the lower connecting member 30 increases. Accordingly, the rigidity of the lower connecting member 30 is enhanced in the right-left direction, and the load can be successfully transmitted in the transverse direction. Further, since the front end of the folded-back flange 35 is located rearward of the lower end of the front wall portion 31 (i.e., the connecting portion connecting the front wall portion 31 and the lower flange 34), when a rear-end collision occurs, the front end edge of the folded-back flange 35 does not strongly contact the seat back cushion. This can relieve the tactile sensation that the occupant feels from the lower connecting member 30, and also prevent damage of the seat back cushion.

Figure 6:
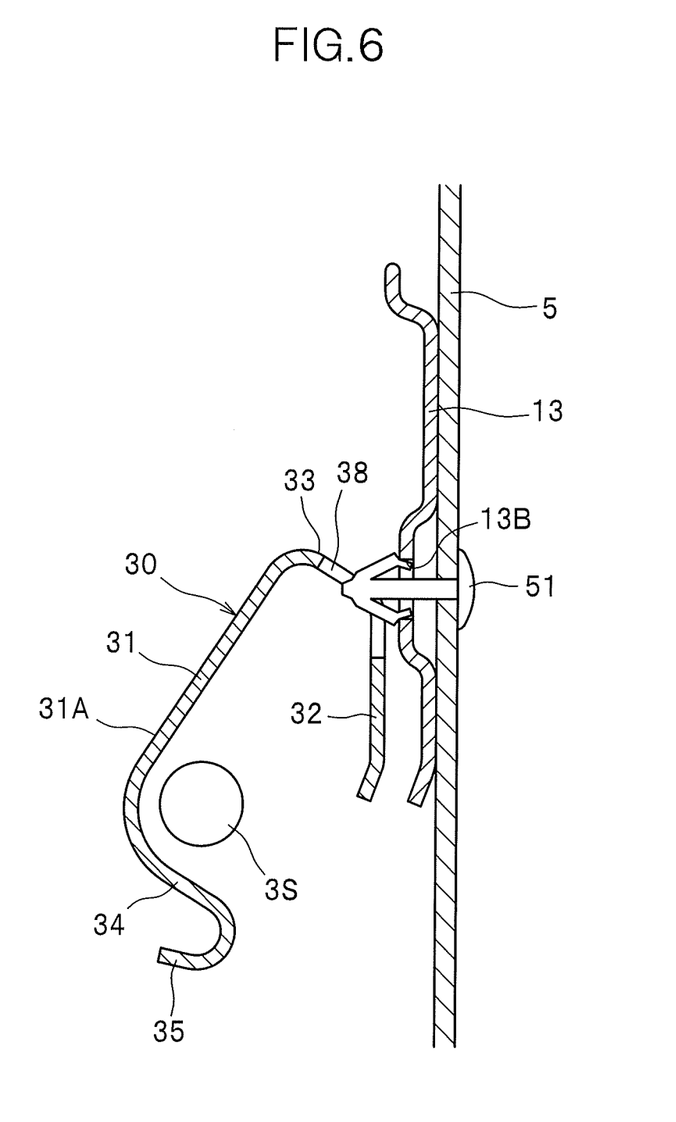
FIG. 6 is a side sectional view explaining an attachment structure for a rear cover for a seat back.

The rear wall portion 32 of the lower connecting member 30, more specifically a portion extending from the rear wall portion 32 to the upper wall portion 33, has two through-openings 38 at right and left parts thereof. As seen in FIG. 6, each through-opening 38 serves as a relief to avoid interference of the front end of the clip 51 with the rear wall portion 32 of the lower connecting member 30 when the back-side cover 5 is attached to the clip hole 13B using the clip 51. For this purpose, the through-openings 38 are formed in positions corresponding to the clip holes 13B.

As seen in FIG. 5, the lower connecting member 30 does not reach the side wall portions 12A, and narrow gaps are present between the lower connecting member 30 and the side wall portions 12A. However, as long as any problems do not arise due to a manufacturing error of the lower connecting member 30 or due to the lower connecting member 30 riding on the corner portion of the lower member 12, the both ends of the lower connecting member 30 may contact the side wall portions 12A.

Operation of the above-described car seat S in a rear-end collision will be described.

Figure 7:
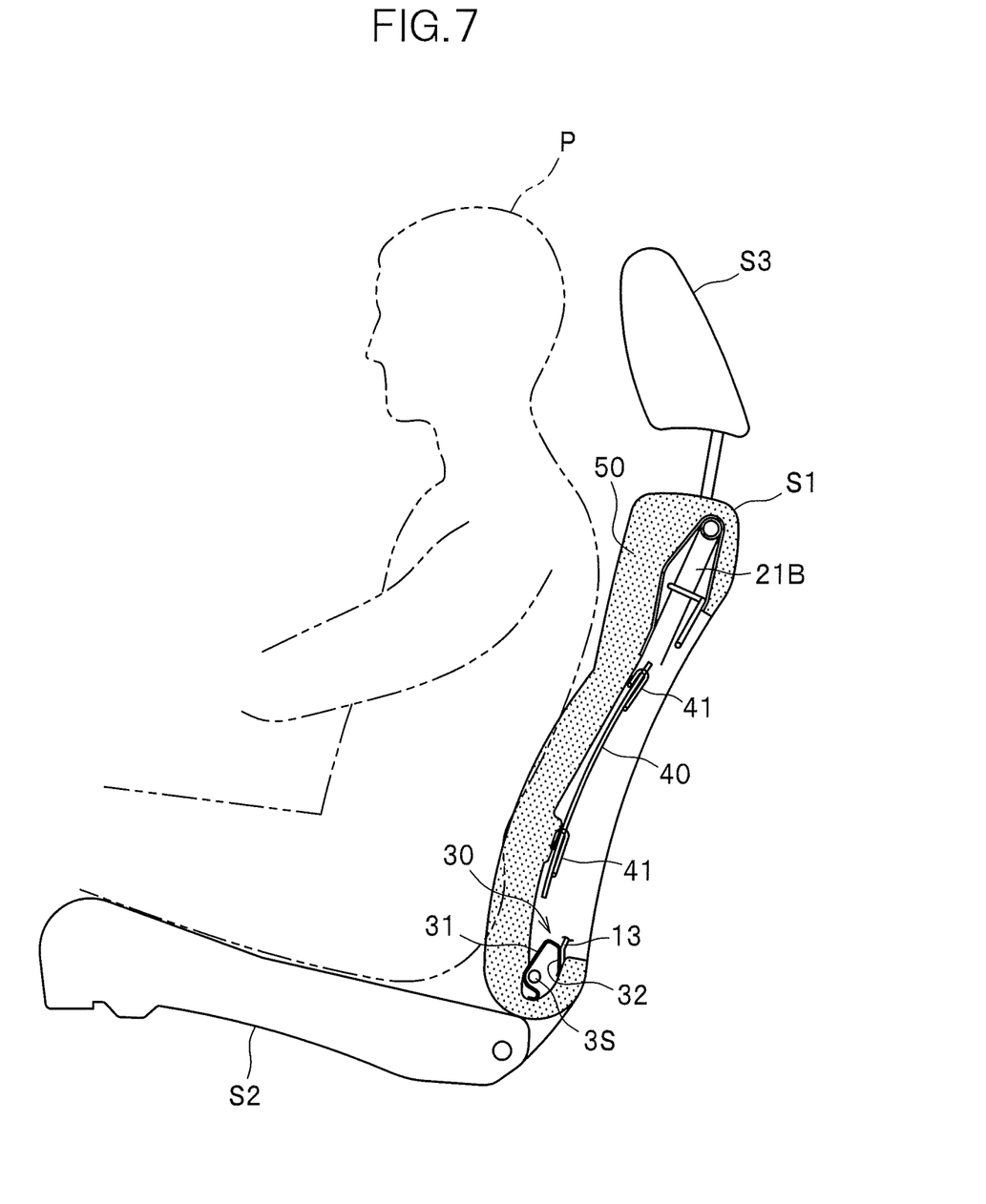
FIG. 7 is a side sectional view showing the seat back frame in the normal position.

As seen in FIG. 7, before a rear-end collision occurs, the rotatable members 45 are located at positions where the lower ends of the rotatable members 45 have been swung forward, and the pressure-receiving member 40 is located in the forwardmost position within the movable range of the pressure-receiving member 40. Although the rotatable members 45 are not shown from FIG. 7 to FIG. 9, the lower ends of the rotatable members 45 are located at forward positions in the normal state shown in FIG. 7.

Figure 8:
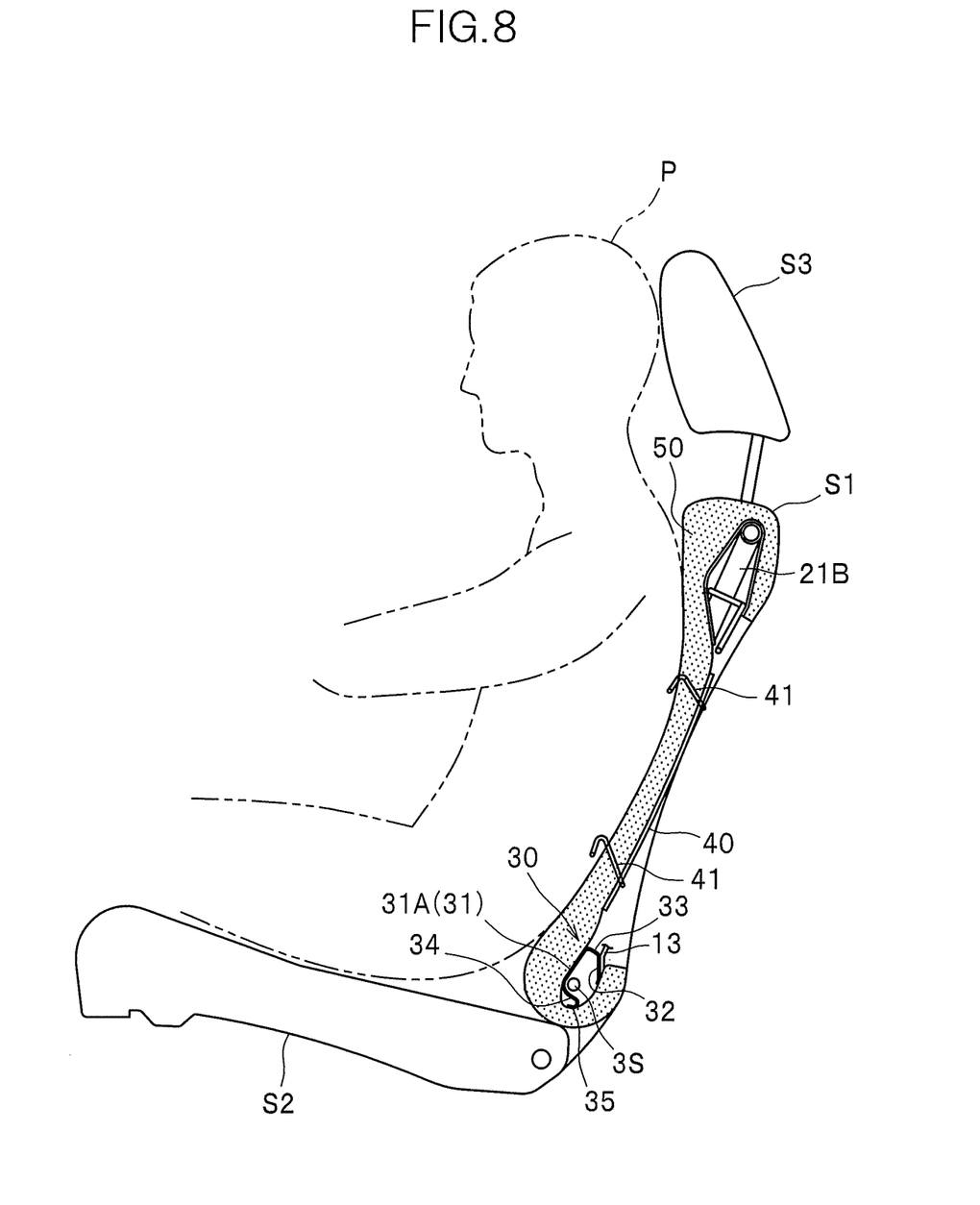
FIG. 8 is a side sectional view showing the seat back frame during a weak rear-end collision.

As seen in FIG. 8, if a relatively weak rear-end collision occurs, the center part of the seat back cushion 50 (i.e., portion to which the back of the occupant P contacts) moves rearward to cause the seat back cushion 50 to push the pressure-receiving member 40 rearward, with the result that the pressure-receiving member 40 moves rearward. During this time, the lower ends of the rotatable members 45 swing rearward. Further, the lower part of the seat back cushion 50 (i.e., portion to which the buttocks region of the occupant P contacts) deforms to some extent because the inner side of the seat back cushion 50 contacts the front surface 31A of the lower connecting member 30. However, since the front surface 31A has a large area and is slightly slanted to face obliquely upward with respect to the connecting portion 21B and the rear wall portion 32, the buttocks region of the occupant P receives a reaction force as a small pressure, from the lower connecting member 30, so that the occupant P feels the tactile sensation caused by the lower connecting member 30 as a soft one. Further, since a gentle curve is formed at the connecting portion connecting the front wall portion 31 and the upper wall portion 33 of the lower connecting member 30 and at the connecting portion connecting the front wall portion 31 and the lower flange 34, the occupant P does not feel a strong tactile sensation because of the presence of the lower connecting member 30. Further, since the front end of the folded-back flange 35 is located rearward of the lower end of the front wall portion 31, the front end edge of the folded-back flange 35 does not strongly contact the inner surface of the seat back cushion 50, which can prevent damage of the seat back cushion 50. Further, since the front wall portion 31 is disposed in front of the shaft 3S, the seat back cushion 50 does not directly contact the shaft 3S. Accordingly, the occupant P does not feel a tactile sensation because of the presence of the shaft S.

Figure 9:
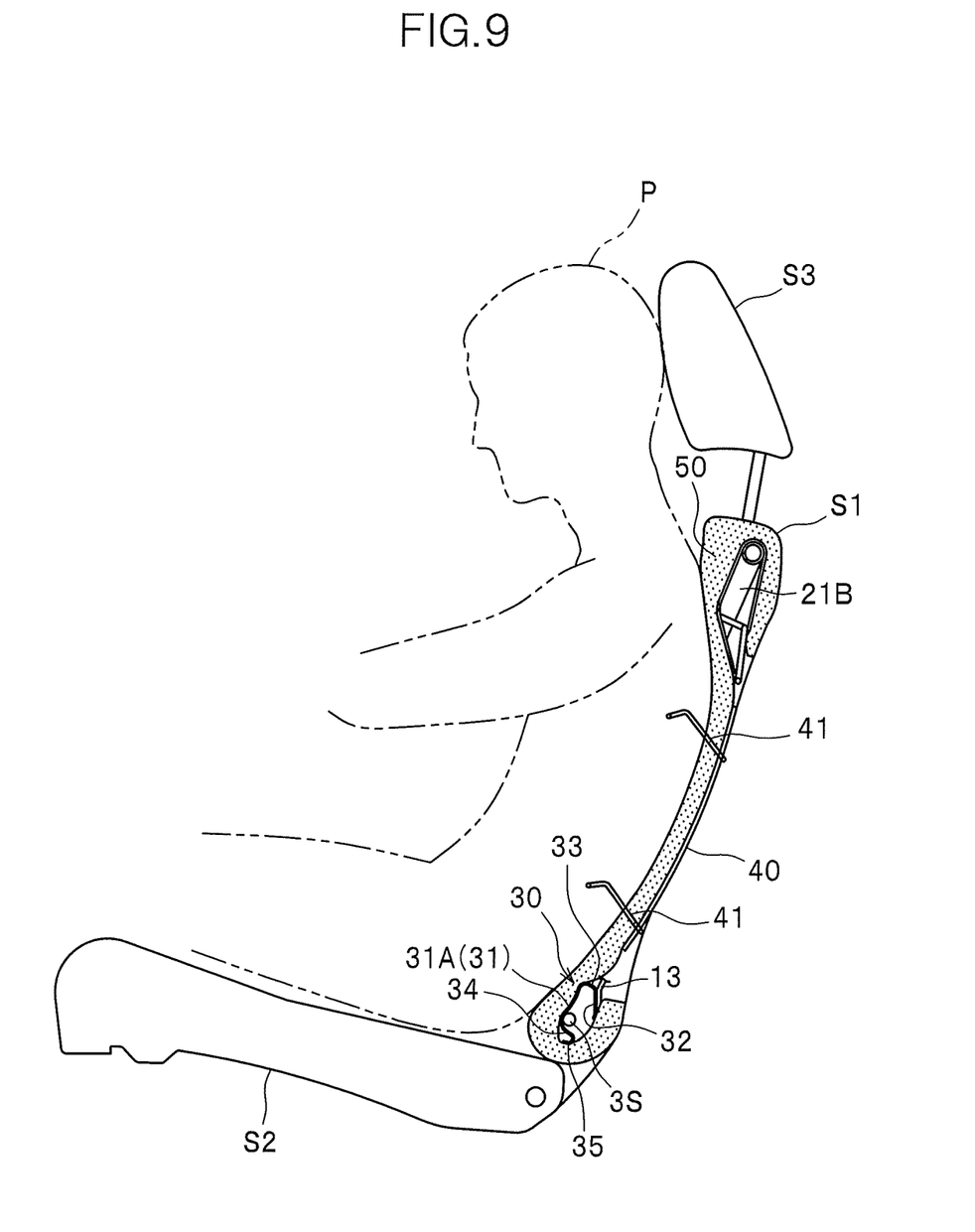
FIG. 9 is a side sectional view showing the seat back frame during a strong rear-end collision.

As seen in FIG. 9, if a relatively strong rear-end collision occurs, the center part of the seat back cushion 50 moves rearward to a large extent, and accordingly, the pressure-receiving member 40 also moves rearward to a large extent with the connecting wires 41 being elastically deformed. During this time, the seat back cushion 50 strongly contacts the front surface 31A of the lower connecting member 30, and the lower connecting member 30 is bent and deforms at the connecting portion including the upper wall portion 33, which connects the front wall portion 31 and the rear wall portion 32. Thus, even if a strong force is applied from the buttocks region of the occupant P to the seat back cushion 50, the front wall portion 31 of the lower connecting member 30 moves rearward to absorb the impact, with the result that the occupant P does not feels a tactile sensation at his/her buttocks region. In particular, according to the car seat S of this embodiment, since the flat plate-like upper wall portion 33 extends substantially in the front-rear direction between the front wall portion 31 and the rear wall portion 32, a space can be ensured between the front wall portion 31 and the rear wall portion 32 to keep the deformation stroke for allowing the front wall portion 31 to deform rearward (i.e., impact absorption).

Since a gentle curve is formed at the connecting portion connecting the front wall portion 31 and the upper wall portion 33 of the lower connecting member 30 and at the connecting portion connecting the front wall portion 31 and the lower flange 34, as with the case of the weak rear-end collision, the occupant P is less likely to feel a strong tactile sensation because of the presence of the lower connecting member 30. Further, since the front end of the folded-back flange 35 is located rearward of the lower end of the front wall portion 31, the front end edge of the folded-back flange 35 does not strongly contact the inner surface of the seat back cushion 50, which can prevent damage of the seat back cushion 50. Further, since the front wall portion 31 is disposed in front of the shaft 3S, the seat back cushion 50 does not directly contact the shaft 3S, and so the tactile sensation that the occupant P feels from the shaft 3S can be alleviated.

In the car seat S according to this embodiment, since the lower connecting member 30 does not have a conventional plate-like shape, and includes the front wall portion 31 and the rear wall portion 32 which are connected to each other at their upper portions, the lower connecting member 30 as a whole has enhanced rigidity resisting a bending load in the front-rear direction. The lower frame of the conventional car seat may deform to be bent into V-shape as viewed from above when a rear-end collision occurs, such that the center part of the lower frame moves rearward relative to the side frames and hence the side frames move inward (change their orientation) so that the front ends thereof become closer to each other in the lateral direction. However, such a deformation is less likely to occur in the car seat S according to this embodiment. Namely, the lower connecting member 30 is likely to allow the deformation such that the front wall portion 31 approaches the rear wall portion 32, but less likely to allow the deformation such that the member as a whole is bent into V-shape as viewed from above. This can restrict deformation of the side frames SF. Further, since the lower connecting member 30 is provided and extending between the right and left side frames SF, if a load is applied to deform the side frames SF inward, the front wall portion 31 is brought into contact with the inner surfaces of the side frames SF to thereby prevent deformation of the side frames SF.

Further, in the car seat S according to this embodiment, since the lower connecting member 30 is disposed and extends between the right and left side frames SF, and includes the front wall portion 31, the rear wall portion 32, the upper wall portion 33, the lower flange 34, and the folded-back flange 35 to provide sufficient sectional area, if the car receives a collision load from a side, the lower connecting member 30 prevents the car seat S from being crushed in the right-left direction and can transmit a load from a side to a center of the car. In particular, since the lower connecting member 30 is welded to the inner extensions 13 of the side frames SF at the slanted edge portions 13A, the lower connecting member 30 can be fixed to the side frames SF with longer weld length and with sufficient strength. This can enhance the rigidity of the seat back frame 1 so that a load can be transmitted efficiently from a side to a center of the car. In other words, increasing the weld length at positions between the lower connecting member 30 and the inner extensions 13 can enhance the rigidity of the car seat S in the right-left direction without the need for enlarging the vertical size of the lower connecting member 30.

Further, in the car seat S according to this embodiment, since the rear wall portion 32 of the lower connecting member 30 has through-openings 38 as relieves, interference between the clip 51 and the rear wall portion 32 can be avoided when the back-side cover 5 for the seat back S1 is fixed to the rear wall portion 32 and the assembly operation is easily performed. In other words, the interference between the clip 51 and the rear wall portion 32 can be avoided even if the rear wall portion 32 has some error in the size or the shape thereof, with the result that the assembly of the lower connecting member 30 and the side frames SF, and the attachment of the clips 51 can be carried out easily without the need for paying particular attention to these operations. Further, the relieves are formed as through-holes 38, and this makes it possible to easily manufacture the lower connecting member 30 by press working sheet metal because the relieves can be easily formed by blanking.

Although one embodiment of the present invention has been described above, the present invention may be embodied in modified forms, where necessary, as will be described in the following other embodiments.

Figure 10:
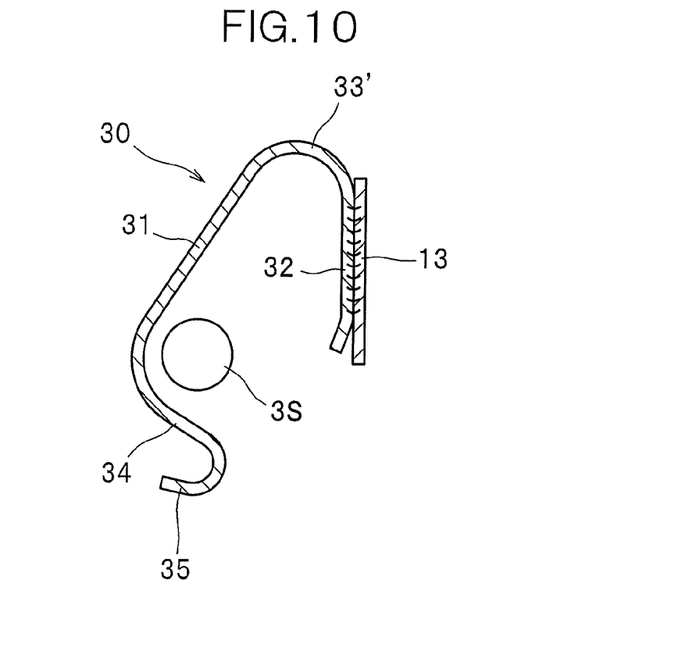
FIG. 10 is a side sectional view of the lower connecting member according to a modified embodiment.

In the above embodiment, the lower connecting member 30 has the flat plate-like upper wall portion 33. However, for example, as seen in FIG. 10, the upper wall portion 33' connecting the front wall portion 31 and the rear wall portion 32 may be curved to have a single circular arc-cross section.

Figure 11:
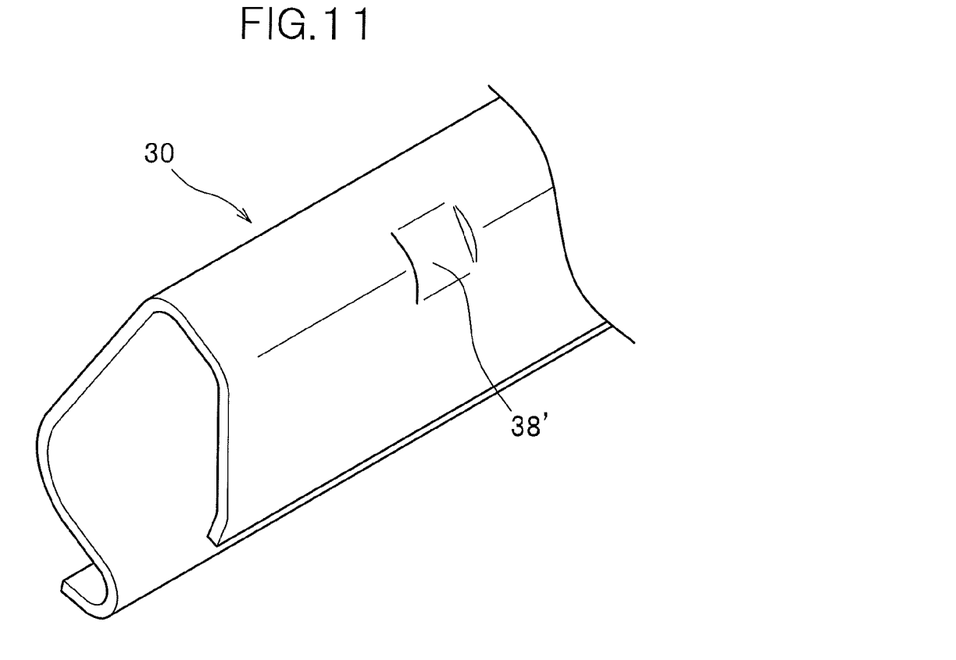
FIG. 11 is a perspective view showing a relief provided on the lower connecting member according to a modified embodiment.

Further, in the above embodiment, the relieves of the lower connecting member 30 are through-openings 38. However, as seen in FIG. 11, the relieves may be recess portions 38'. Providing the recess portions 38' in place of the through-openings 38 makes it possible to create the relieves without diminishing the strength of the rear wall portion 32, while avoiding interference between the clip 51 and the rear wall portion.

In the above embodiment, the front surface 31A of the front wall portion 31 is slanted to face obliquely upward, as viewed from side, with respect to the direction along which the pipe of the connecting portions 21B extends. However, the front surface 31A may be parallel to the pipe-extending direction.

In the above embodiment, the pressure-receiving member 40 is provided to assist the occupant P in getting sunk into the seat back S1 in a rear-end collision. However, the present invention may be applied to a seat without the pressure-receiving member 40. According to the configuration where the pressure-receiving member 40 is employed, the pressure-receiving member 40 allows the occupant to readily approach the lower connecting member 30, and so the present invention can be effectively used for this configuration.

In the above embodiment, the slanted edge portion 13A of each inner extension 13 is slanted with respect to the vertical direction such that the inner end portion thereof extends from inward to outward as it goes from upward to downward. However, in contrast to this configuration, the slanted edge portion 13A may be slanted with respect to the vertical direction such that the inner end portion thereof extends from outward to inward as it goes from upward to downward.

In the above embodiment, the pressure-receiving member 40 is supported by the side frames SF through the connecting wires 41. However, the pressure-receiving member 40 may be supported by the side frames SF using other connecting members made of a material such as rubber or belt.

In the above embodiment, the back-side cover for the seat back is illustrated as an example of the fixed part. However, a part such as a harness, switches operable by an occupant seated in the rear seat, or a rear pocket may be attached as the fixed part. Further, instead of the attachment holes in the form of simple holes, the attachment holes may be holes into which tapping screws are screwed or holes with internal thread. Further, bolts, tapping screws, and rivets may be used as the fixing members.

Further, the front surface 31A of the front wall portion 31 is not necessary to have a smooth surface, and may include a stepped surface.

In the above embodiment, the car seat S is illustrated as an example of the vehicle seat. However, the vehicle seat according to the present invention is applicable to other vehicle seat, such as a seat for marine vessel and a seat for aircraft.

The invention claimed is:

1. A vehicle seat, comprising:
 a seat bottom frame as a frame of a seat bottom allowing an occupant to sit thereon, and a seat back frame supported by the seat bottom frame,
 wherein the seat back frame includes right and left side frames laterally spaced apart from each other, and a lower connecting member disposed and extending between lower portions of the right and left side frames and configured to connect the right and left side frames to each other, each of the lower portions of the right and left side frames having a side wall portion and an inner extension configured to extend inward from a rear end of the side wall portion, said lower connecting member being a single unitary sheet of bent metal, and
 wherein the lower connecting member includes:
  a rear wall portion connected to and supported by the side frames, the rear wall portion including an upper end and a lower end, the lower end being downward from the upper end,
  a front wall portion disposed frontward of the rear wall portion, the front wall portion extending downward from the upper end of the rear wall portion,
  a front surface of the front wall portion has an upper portion and a lower portion which is located frontward of the upper portion,
  the rear wall portion being located forward of the inner extensions in contact with a front surface of the inner extensions and fixed to the inner extensions, and
  the front wall portion having a lower end spaced apart from the rear wall portion to form a free end, the free end being not directly connected to the rear wall portion, and the free end being not directly connected to the inner extension.

2. The vehicle seat according to claim 1, wherein the front wall portion extends downward beyond the rear wall portion.

3. The vehicle seat according to claim 1, wherein the front wall portion is tilted such that the front surface thereof faces obliquely upward with respect to the rear wall portion.

4. The vehicle seat according to claim 1, further comprising an upper wall portion connecting the rear wall portion and the front wall portion, wherein the upper wall portion is shaped like a flat plate extending substantially in a front-rear direction.

5. The vehicle seat according to claim 1, wherein the seat back frame is rotatably supported by the seat bottom frame through a reclining mechanism,
 wherein the reclining mechanism includes a shaft configured to connect the right and left side frames to each other and disposed at a position on a rotation axis between the seat bottom frame and the seat back frame, and
 wherein the front wall portion is disposed in front of the shaft.

6. The vehicle seat according to claim 1,
 wherein an inner end of the inner extension has a slanted edge portion which is slanted with respect to a vertical direction, and the rear wall portion is welded to the inner extension along the slanted edge portion.

7. The vehicle seat according to claim 6, wherein the slanted edge portion is slanted with respect to the vertical direction at an angle equal to or greater than 20 degrees.

8. The vehicle seat according to claim 1, further comprising a pressure-receiving member disposed between the right and left side frames and movable in a rearward direction, a connecting wire configured to connect the pressure-receiving member to the side frames, and rotatable members which are rotatably supported by the right and left side frames and to which the connecting wire is connected, wherein a rotation axis of each rotatable member is located rearward of the lower connecting member.

9. A vehicle seat, comprising:
 a seat bottom frame as a frame of a seat bottom allowing an occupant to sit thereon, and a seat back frame supported by the seat bottom frame,
 wherein the seat back frame includes right and left side frames laterally spaced apart from each other, and a lower connecting member disposed and extending between lower portions of the right and left side frames and configured to connect the right and left side frames to each other, and
 wherein the lower connecting member includes:
  a rear wall portion connected to and supported by the side frames,
  a front wall portion disposed frontward of the rear wall portion and extending downward from an upper end of the rear wall portion, and
  a front surface of the front wall portion has an upper portion and a lower portion which is located frontward of the upper portion,
 wherein each of the lower portions of the right and left side frames has a side wall portion and an inner extension configured to extend inward from a rear end of the side wall portion,
 wherein the rear wall portion of the lower connecting member is fixed to each of the inner extensions, and each inner extension has an attachment hole through which a fixing member for fixing a fixed part is inserted, and
 wherein the rear wall portion has relieves each provided at a position corresponding to the attachment hole to avoid interference with the fixing member.

10. The vehicle seat according to claim 9, wherein the relieves are recess portions.

11. The vehicle seat according to claim 9, wherein the relieves are through-openings.

12. A vehicle seat, comprising:
 a seat bottom frame as a frame of a seat bottom allowing an occupant to sit thereon, and a seat back frame rotatably supported by the seat bottom frame through a reclining mechanism,
 wherein the seat back frame includes right and left side frames laterally spaced apart from each other, and a lower connecting member disposed and extending between lower portions of the right and left side frames and configured to connect the right and left side frames to each other, each of the lower portions of the right and left side frames having a side wall portion and an inner extension configured to extend inward from a rear end of the side wall portion, said lower connecting member having a front wall portion and a rear wall portion all part of a single unitary sheet of bent metal, wherein the reclining mechanism includes a shaft configured to connect the right and left side frames to each other and disposed at a position on a rotation axis between the seat bottom frame and the seat back frame, wherein the rear wall portion of the lower connecting member includes an upper end and a lower end, the lower end being downward from the upper end, wherein the front wall portion is disposed frontward of the rear wall portion, the front wall portion extending downward from the upper end of the rear wall portion, and wherein the front wall portion is disposed in front of the shaft, and a front surface of the front wall portion has an upper portion and a lower portion which is located frontward of the upper portion, wherein the lower portion springs back to allow the unitary sheet to absorb a longitudinal force such that the longitudinal force does not directly act on the shaft, the front wall portion having a lower end spaced apart from the rear wall portion to form a free end, the free end being not directly connected to the rear wall portion, and the free end being not directly connected to the inner extenstion.

13. The vehicle seat according to claim 12, wherein the rear wall portion is disposed rearward of the front wall portion and extending downward from the front wall portion, wherein the rear wall portion is connected to the side frames.

* * * * *